(12) United States Patent
Bassirat et al.

(10) Patent No.: US 11,638,326 B1
(45) Date of Patent: Apr. 25, 2023

(54) SYSTEMS AND METHODS FOR RADIO UNIT BACKUP CONNECTIONS

(71) Applicant: DISH Wireless L.L.C., Englewood, CO (US)

(72) Inventors: Farhad Bassirat, Arlington, VA (US); Frank Tao Yu, Broadlands, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 17/550,166

(22) Filed: Dec. 14, 2021

(51) Int. Cl.
*H04W 84/02* (2009.01)
*H04L 41/0654* (2022.01)
*H04L 61/5076* (2022.01)
*H04L 101/622* (2022.01)
*H04W 88/08* (2009.01)

(52) U.S. Cl.
CPC ......... *H04W 84/02* (2013.01); *H04L 41/0654* (2013.01); *H04L 61/5076* (2022.05); *H04L 2101/622* (2022.05); *H04W 88/085* (2013.01)

(58) Field of Classification Search
None
See application file for complete search history.

(56) References Cited

U.S. PATENT DOCUMENTS

| | | | | |
|---|---|---|---|---|
| 9,078,157 B2 * | 7/2015 | Chiang | ................. | H04W 24/04 |
| 9,479,927 B1 * | 10/2016 | Bales | ...................... | H04L 45/28 |
| 11,081,781 B1 * | 8/2021 | McSchooler | .......... | H01Q 1/246 |
| 2008/0186878 A1 * | 8/2008 | Zheng | ................. | H04W 88/085 370/254 |
| 2010/0248713 A1 * | 9/2010 | Parker | ................. | H04L 41/0663 455/445 |
| 2014/0056122 A1 * | 2/2014 | Singal | ..................... | H04L 45/28 370/220 |
| 2014/0187236 A1 * | 7/2014 | Chiang | ................. | H04W 24/04 455/423 |
| 2016/0036624 A1 * | 2/2016 | Roy | .................... | H04L 43/0811 370/221 |
| 2016/0345192 A1 * | 11/2016 | Garg | .................. | H04L 12/2854 |
| 2017/0086082 A1 * | 3/2017 | Narayanan | .......... | H04L 41/0668 |
| 2021/0185749 A1 * | 6/2021 | Abedini | ............... | H04W 76/15 |

(Continued)

OTHER PUBLICATIONS

"Cloud RAN and eCPRI fronthaul in 5G networks," EventHelix, 9 pages, Feb. 4, 2018 website: https://medium.com/5g-nr/cloud-ran-and-ecpri-fronthaul-in-5g-networks-alf63dl3df67.

(Continued)

*Primary Examiner* — Kenny S Lin
(74) *Attorney, Agent, or Firm* — Jeremiah J. Baunach; VLP Law Group LLP (57) ABSTRACT

When a failed connection is detected from a first radio unit (RU) to the cellular site router (CSR), activation of an existing backup cabled connection from the first RU to the CSR through a cabled connection between the first RU and a second RU of the cellular telecommunications tower may be performed. In one example, a first RU and second RU each have two physical network ports. The activation of the existing backup cabled connection from the first RU, via the second RU, to the CSR may include causing the first RU to enter from a normal operating mode into an Open Radio Access Network (O-RAN) cascade operating mode to attempt to attain network connectivity for the first RU using the second physical network port of the first RU.

20 Claims, 6 Drawing Sheets

(56) References Cited

U.S. PATENT DOCUMENTS

| | | | |
|---|---|---|---|
| 2022/0272594 A1* | 8/2022 | Anderson | H04L 41/0663 |
| 2022/0353775 A1* | 11/2022 | Wager | H04W 36/305 |
| 2022/0361275 A1* | 11/2022 | Da Silva | H04W 76/18 |
| 2022/0394763 A1* | 12/2022 | Wang | H04W 74/0808 |

OTHER PUBLICATIONS

"Ethernet OAM Overview, Connectivity Fault Management & Performance Monitoring," Accedian Networks Inc., 4 pages, Oct. 2016 website: https://accedian.com/wp-content/uploads/2016/10/Accedian-Ethernet-OAM-Overview-White-Paper-2016-1Q.pdf.

"Open RAN Explained," Nokia, 10 pages, Oct. 16, 2020 website: https://www.nokia.com/about-us/newsroom/articles/open-ran-explained/.

O-RAN.WG4.CUS.0-v06.00, O-RAN Fronthaul Working Group, Control, User and Synchronization Plane Specification, 298 pages, 2021.

O-RAN.WG4.MP.0-v06.00, O-RAN Alliance Working Group 4, Management Plane Specification, 205 pages, 2021.

* cited by examiner

```
200 ─┐
     ▼

┌─────────────────────────────────────────────────────────────────┐
│ 202 Determine cabled connection directly between first radio unit and │
│                cellular site router has failed                  │
└─────────────────────────────────────────────────────────────────┘
                                │
                                ▼
┌─────────────────────────────────────────────────────────────────┐
│ 204 Initiate activation of an existing backup cabled connection from the │
│  first radio unit to the cellular site router through a cabled connection │
│         between the first radio unit and a second radio unit    │
└─────────────────────────────────────────────────────────────────┘
```

302 Cause the second radio unit to enter from a normal operating mode into an O-RAN cascade operating mode to attempt to attain network connectivity for the first radio unit

304 Use Ethernet forwarding to attempt to forward the Ethernet packets received from the first radio unit to the cellular site router over existing separate cabled connection of the second radio unit directly to the cellular site router

SYSTEMS AND METHODS FOR RADIO UNIT BACKUP CONNECTIONS

TECHNICAL FIELD

The present disclosure relates generally to wireless cellular telecommunications, more particularly, to radio unit backup connections in such telecommunication networks.

BRIEF SUMMARY

In various instances there may be a connection issue that occurs between a radio unit (RU) of a radio tower and a cellular site router of the associated cellular telecommunications base station. For example, a cabled connection directly between the RU and the CSR may fail. This may cause an undesired disruption in cellular telecommunication service. Fast recovery from such connection issues is important in providing reliable cellular telecommunication service.

In order to solve such a technical problem, when failed connection is detected from a first RU to the CSR, activation of an existing backup cabled connection from the first RU to the CSR through a cabled connection between the first RU and a second RU of the cellular telecommunications tower may be performed. For example, when a direct cabled connection from the first RU to the CSR fails, the existing backup cabled connection from the first RU to the CSR 130 through a cabled connection between the first RU and the second RU may be activated and utilized for the first RU to continue to communicate with the CSR 130.

In an example, embodiment, the first RU and second RU each have two physical network ports (e.g., small form pluggable (SFP) ports, each with its own media access control (MAC) address). The activation of the existing backup cabled connection from the first RU, via the second RU, to the CSR may include causing the first RU to enter from a normal operating mode into an Open Radio Access Network (O-RAN) cascade operating mode to attempt to attain network connectivity for the first RU using the second physical network port of the first RU.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
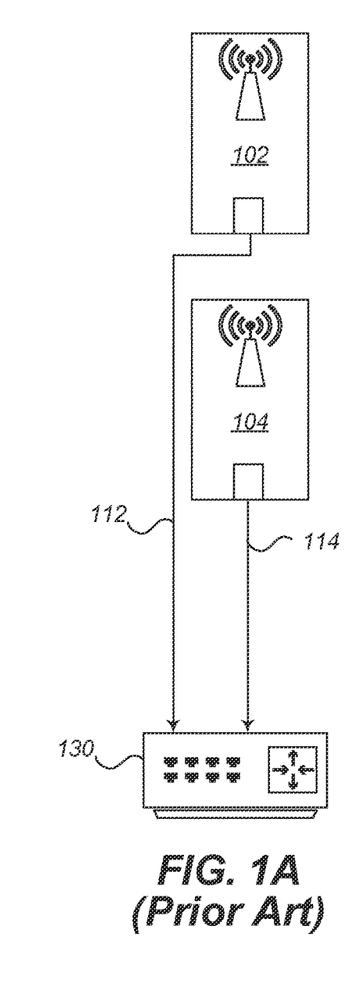
FIG. 1A is a block diagram illustrating a prior art system including a first RU of a cellular telecommunications tower, a second RU of the cellular telecommunications tower and CSR of the cellular telecommunications tower.

FIG. 1A is a block diagram illustrating a prior art system including a first radio unit (RU) of a cellular telecommunications tower, a second radio unit (RU) of the cellular telecommunications tower and cellular site router (CSR) of the cellular telecommunications tower.

The mobile, or cellular/wireless network comprises two domains: the Radio Access Network (RAN) and the Core Network (Core). The RAN is the final link between the network and the mobile phone or other connected device. It is the visible piece and includes the antennae seen on cellular telecommunications towers, on top of buildings or in stadia, plus the base stations. When a cellular telephone call is made or a connection to a remote server, the antenna transmits and receives signals to and from the cellular telephone phones or other connected devices, e.g., Internet-of-Things (IoT) devices. The signal is then digitalized in the RAN base station and connected into the network.

The Core has many functions. It provides access controls ensuring users are authenticated for the services they are using, it routes telephone calls over the public-switched telephone network, it enables operators to charge for calls and data use, and it connects users to the rest of the world via the Internet. It also controls the network by making handovers happen as a user moves from coverage provided by one RAN tower to the next.

In an Open RAN environment, the RAN is disaggregated into three main building blocks: the Radio Unit (RU), the Distributed Unit (DU) and the Centralized Unit (CU). The RUs, such as RU 102 and RU 102 of FIG. 1A, are located at the cellular telecommunications tower base station and are where the radio frequency signals are transmitted, received, amplified and digitized. The RU is located near, or integrated into, the antenna of the cellular telecommunications tower. Each cellular telecommunications tower may have multiple RUs to fully service a particular coverage area. The DU and CU (not shown) are the computation parts of the base station. They receive the digitialized radio signal from the RUs (the first RU 102 and the second RU 104) via the cellular site router (CSR) 130 that routes traffic from the RUs to the DU, and send the digitialized radio signal into the network. The DU is physically located at or near the RU whereas the CU can be located nearer the Core. The key concept of Open RAN is "opening" the protocols and interfaces between these various building blocks (radios, hardware and software) in the RAN. The O-RAN Alliance has defined at least 11 different interfaces within the RAN including those for: Fronthaul between the RU and the DU, Midhaul between the DU and the CU and Backhaul connecting the RAN to the Core.

In various instances there may be a connection issue that occurs between the RU (e.g., RU 102 or RU 104) and the CSR 130. For example, a cabled connection 114 directly between RU 104 and CSR 130 or a cabled connection 112 directly between RU 102 and CSR 130 may fail. This may cause an undesired disruption in cellular telecommunication service. Fast recovery from such connection issues is important in providing reliable cellular telecommunication service.

Figure 1B:
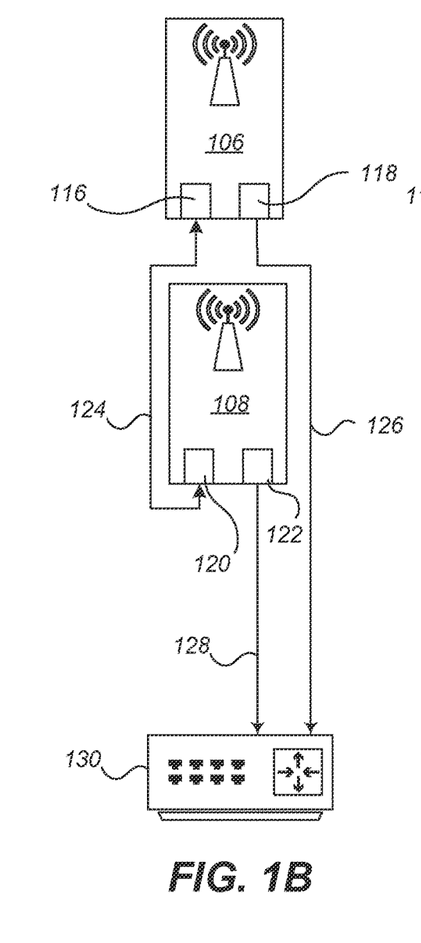
FIGS. 1B and 1C is are block diagrams illustrating activation of an existing backup cabled connection from the first RU to the CSR through a cabled connection between the first RU and a second RU of the cellular telecommunications tower in accordance with embodiments described herein.
Figure 1C:
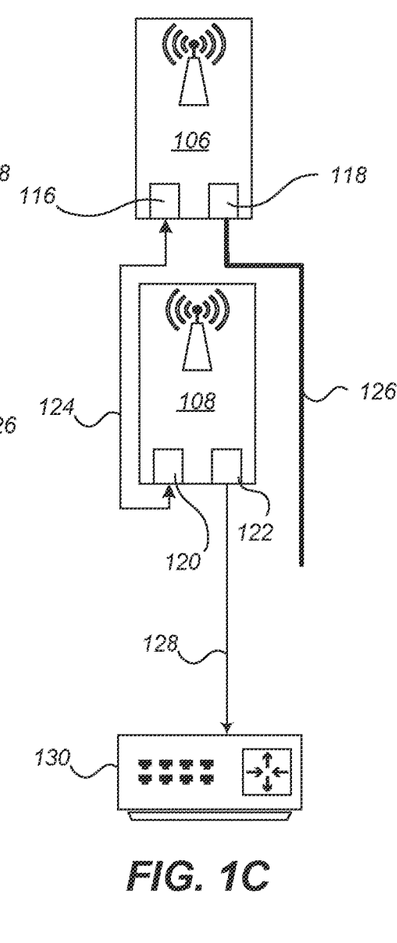

FIGS. 1B and 1C are block diagrams illustrating activation of an existing backup cabled connection 128 from a first RU 106 to the CSR 130 through a cabled connection 124 between the first RU 106 and a second RU 108 of the cellular telecommunications tower in accordance with embodiments described herein. For example, when the direct cabled connection 126 from the first RU 106 to the CSR 130 fails, as shown in FIG. 1B, the existing backup cabled connection 128 from the first RU 106 to the CSR 130 through a cabled connection 124 between the first RU 106 and the second RU 108 may be activated and utilized for the first RU 106 to continue to communicate with the CSR 130.

In an example, embodiment, the first RU 106 and second RU 108 each have two physical network ports (e.g., small form pluggable (SFP) ports, each with its own media access control (MAC) address). As shown, the first RU 106 has physical network port 116 and physical network port 118. The second RU 108 has physical network port 120 and physical network port 122. In one embodiment, the activation of the existing backup cabled connection 128 from the first RU 106, via the second RU 108, to the CSR 130 may include causing the first RU 106 to enter from a normal operating mode into an O-RAN cascade operating mode to attempt to attain network connectivity for the first RU 106 using the second physical network port 116 of the first RU. The O-RAN cascade operating mode is a mode of a shared cell which is realized by several O-RAN radio units (O-RUs) cascaded in chain topology as defined by the O-RAN Alliance specification O-RAN.WG4.CUS.0-v06.00 and O-RAN.WG4.MP.0-v06.00.

Figure 2:
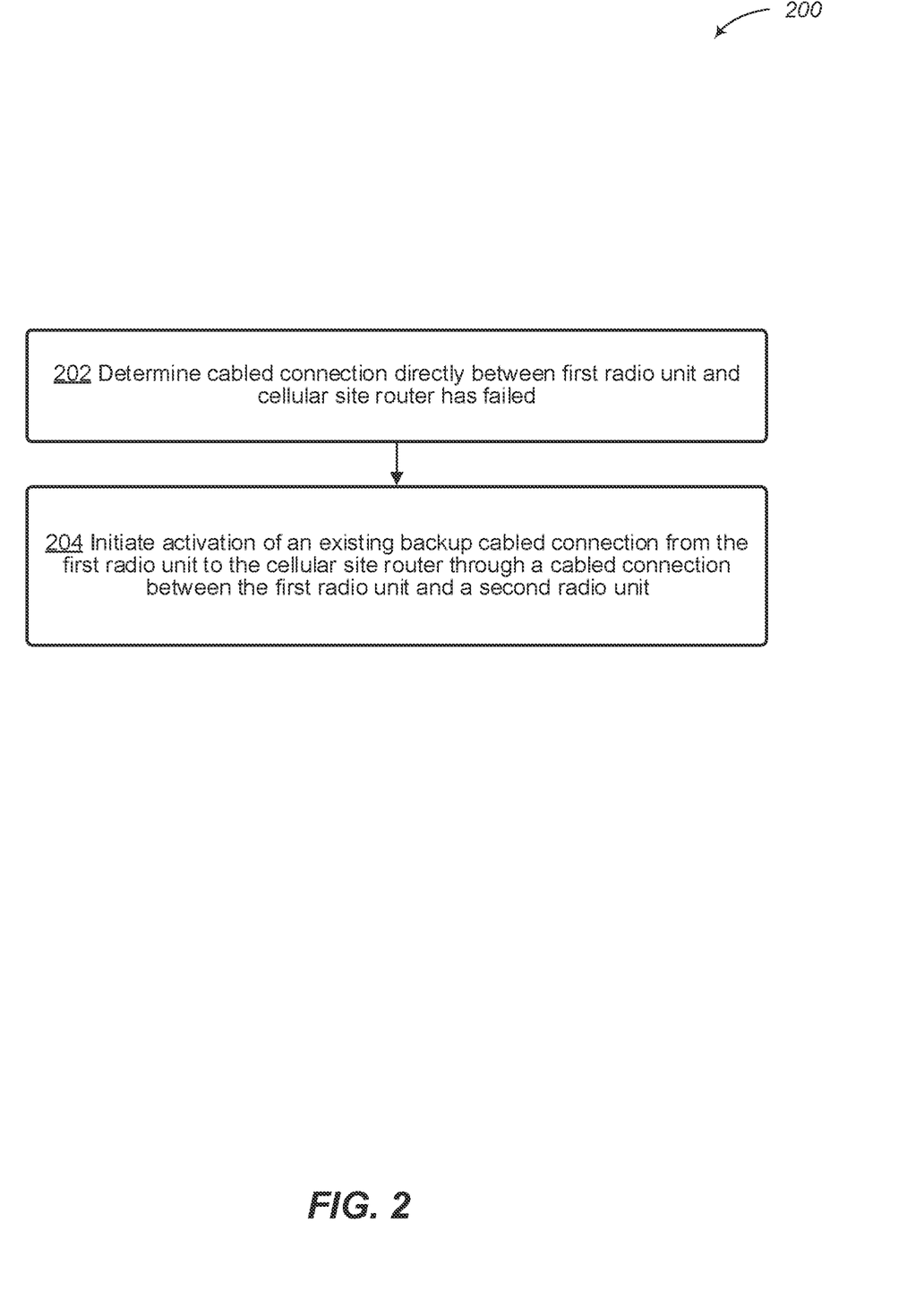
FIG. 2 illustrates a logical flow diagram showing one embodiment of a process for radio unit back connections in accordance with embodiments described herein.

FIG. 2 illustrates a logical flow diagram showing one embodiment of a process 200 for radio unit backup connections in accordance with embodiments described herein. In the processes described in conjunction with FIGS. 2-5, in one example embodiment, the first radio unit and its two respective physical network ports, the second radio unit and its two respective physical network ports, and the cellular site router may be, respectively, the first RU 106 and its two respective physical network ports 116 and 118, the second RU 108 and its two respective physical network ports 120 and 122, and the CSR 130 of FIGS. 1B and 1C.

At 202, a first radio unit determines that a cabled connection directly between the first radio unit of a cellular telecommunications tower and a cellular site router of the cellular telecommunications tower has failed. The cabled connection directly between the first radio unit and the cellular site router uses a first physical network port of the first radio unit. In some embodiments, the cabled connection directly between the first radio unit and the cellular site router and the separate cabled connection of the second radio unit directly to the cellular site router may be fiber optic cable connections. The first physical network port of the first radio unit may be a small form pluggable (SFP) port with its own media access control (MAC) address for use as a separate network address in communication with the second radio unit. The second physical network port of the first radio unit may be also be an SFP port with its own MAC address for use as a separate network address in communication with the cellular site router.

In various example embodiments, determining that the cabled connection directly between the first radio unit and the cellular site router has failed may be based on one or more of: a malfunction of the first physical network port of the first radio unit; a malfunction of a cable providing the cabled connection directly between the first radio unit and the cellular site router; and a malfunction of a physical network port of the cellular site router into which the cable is or was plugged; and a malfunction of one or more transport modules associated with the first physical network port of the first radio unit or a physical network port of the cellular site router.

At 204, the first radio unit, in response to determining that the connection between the first radio unit and the cellular site router has failed, initiates activation of an existing backup cabled connection from the first radio unit to the cellular site router. This existing backup cabled connection may be through a cabled connection between the first radio unit and a second radio unit of the cellular telecommunications tower. The cabled connection between the first radio unit and a second radio unit uses a second physical network port of the first radio unit and the second radio unit also has an existing separate cabled connection directly to the cellular site router.

In an example embodiment, detecting that a connection operability issue exists in the connection between the first radio unit and the cellular site router may include detecting that a connection operability issue exists in the connection between the first radio unit and the cellular site router. This may be based on one or more of: detected expiration of an Open Radio Access Network (O-RAN) management plane (M-plane) supervision watchdog timer that monitors connection between the first radio unit and the cellular site router; one or more Ethernet Loopback Messages (LBM) and Loopback Replies (LBR) over the connection between the first radio unit and the cellular site router; and whether an O-RAN fronthaul control plane/user plane (C/U Plane) Enhanced Common Public Radio Interface (eCPRI) network delay measurement message has been received regarding the connection between the first radio unit and the cellular site router.

Initiating the activation of the existing backup cabled connection from the first radio unit to the cellular site router may include causing the first radio unit to enter from a normal operating mode into an O-RAN cascade operating mode to attempt to attain network connectivity for the first radio unit via the existing backup cabled connection between the first radio unit and the second radio unit using the second physical network port of the first radio unit. Causing the first radio unit to enter from a normal operating mode into an O-RAN cascade operating mode to attempt to attain network connectivity for the first radio unit via the existing backup cabled connection may include causing the first radio unit to perform an O-RAN cascade mode ZTP process that causes the first radio unit to send Ethernet packets to the second radio unit over the backup cabled connection between the first radio unit and the second radio via the second physical network port of the first radio unit instead of the first physical network port of the first radio unit.

Figure 3:
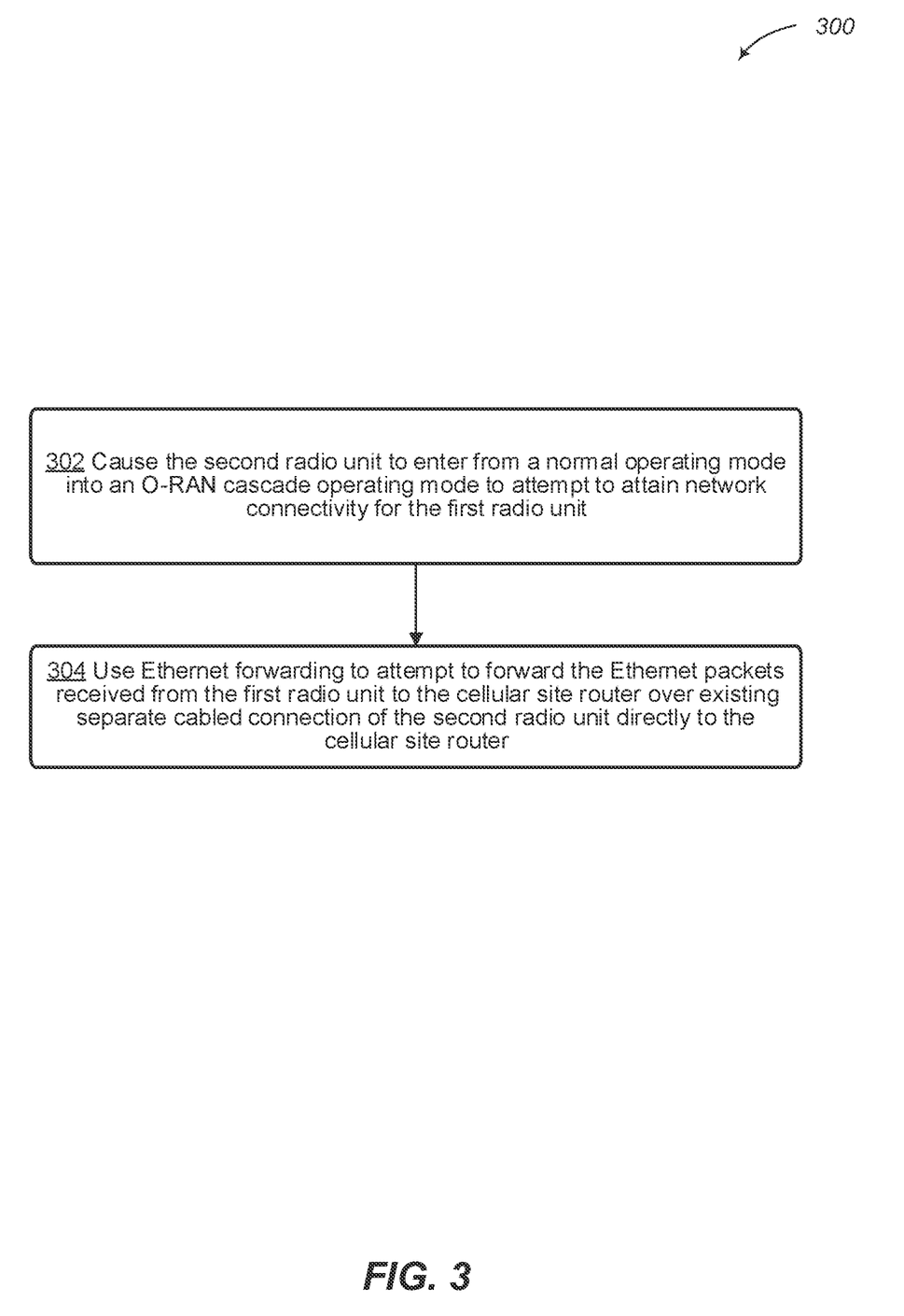
FIG. 3 illustrates a logical flow diagram showing one embodiment of a process for initiating the activation of the existing backup cabled connection from the first RU to the CSR useful in the process of FIG. 2 in accordance with embodiments described herein.

FIG. 3 illustrates a logical flow diagram showing one embodiment of a process 300 for initiating the activation of the existing backup cabled connection from the first radio unit to the cellular site router, useful in the process 200 of FIG. 2 in accordance with embodiments described herein.

At 302, the first radio unit causes the second radio unit to enter from a normal operating mode into an O-RAN cascade operating mode to attempt to attain network connectivity for the first radio unit via the existing backup cabled connection between the first radio unit and the second radio. This may be performed by causing the first radio unit to send Ethernet packets to the second radio unit over the backup cabled connection between the first radio unit and the second radio via the second physical network port of the first radio unit.

At 304, the second radio unit the second radio enters into an O-RAN cascade operating mode causing the second radio unit to use Ethernet forwarding to attempt to forward the Ethernet packets received from the first radio unit to the cellular site router over the existing separate cabled connection of the second radio unit directly to the cellular site router.

Figure 4:
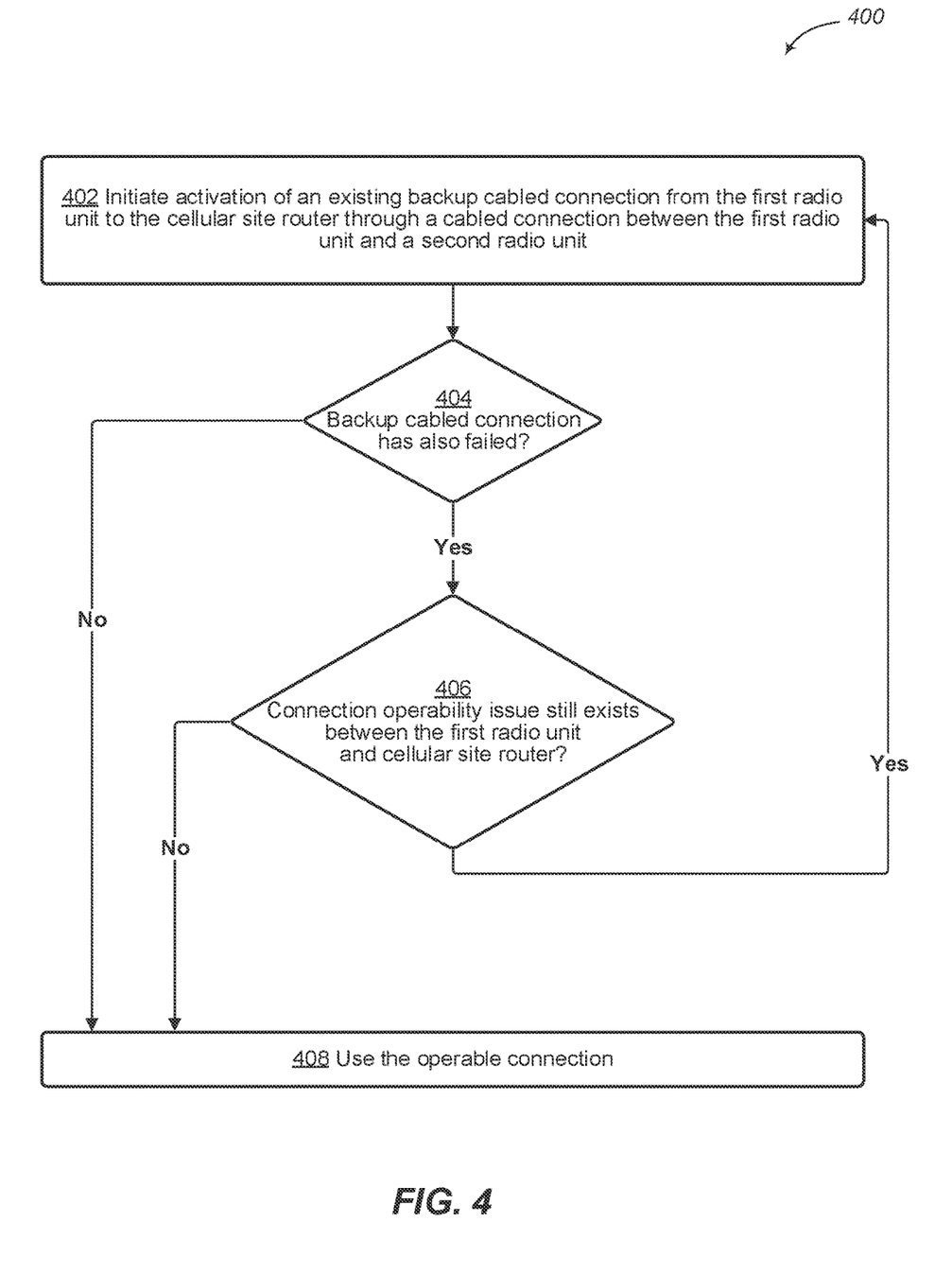
FIG. 4 illustrates a logical flow diagram showing one embodiment of a process for switching to using an operable connection, either the connection between the first RU and the CSR or the backup cabled connection to the CSR, in accordance with embodiments described herein.

FIG. 4 illustrates a logical flow diagram showing one embodiment of a process 400 for switching to using an operable connection, either the connection between the first RU and the CSR or the backup cabled connection to the CSR, in accordance with embodiments described herein.

At 402, the first radio unit, initiates activation of the existing backup cabled connection from the first radio unit to the cellular site router through a cabled connection between the first radio unit and a second radio unit;

At 404, the first radio unit determines whether the backup cabled connection has also failed. If it is determined that the backup cabled connection has also failed, the process 400 proceeds to 406. If it is determined that the backup cabled connection has not also failed, the process 400 proceeds to 408 to use the operable connection.

At 406, the first radio unit determines whether a connection operability issue still exists in the connection between the first radio unit and the cellular site router. If it is determined that a connection operability issue still exists in the connection between the first radio unit and the cellular site router, the process 400 proceeds to 402 to try the backup connection again. If it is determined that a connection operability issue does not still exist in the connection between the first radio unit and the cellular site router, the process 400 proceeds to 408 to use the operable connection between the first radio unit and the cellular site router. Thus the first radio unit performs determining whether the backup cabled connection has also failed and determining whether a connection operability issue still exists in the connection between the first radio unit and the cellular site router in a loop until an operable connection, either the connection between the first radio unit and the cellular site router or the backup cabled connection, is found, and then uses that operable connection.

Figure 5:
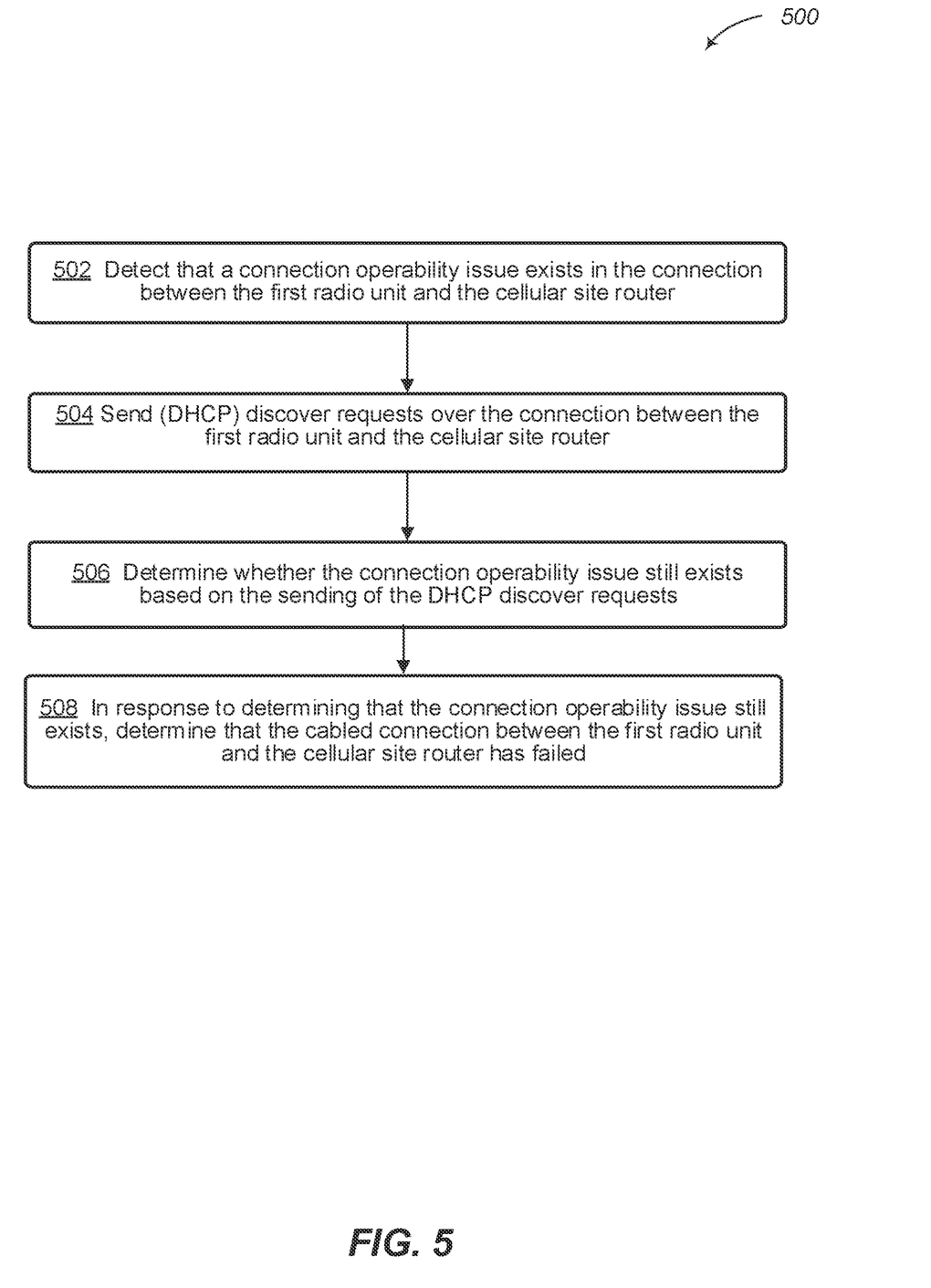
FIG. 5 illustrates a logical flow diagram showing one embodiment of a process for determining that the cabled connection directly between the first radio unit and the cellular site router has failed, useful in the process of FIG. 2, in accordance with embodiments described herein.

FIG. 5 illustrates a logical flow diagram showing one embodiment of a process 500 for determining that the cabled connection directly between the first radio unit and the cellular site router has failed, useful in the process 200 of FIG. 2, in accordance with embodiments described herein.

In an example embodiment, determining that the cabled connection directly between the first radio unit and the cellular site router has failed includes the first radio unit performing the following operations.

At 502, the first radio unit detects that a connection operability issue exists in the connection between the first radio unit and the cellular site router.

At 504, the first radio unit, in response to detecting that the operability issue exists, sends dynamic host control protocol (DHCP) discover requests over the connection between the first radio unit and the cellular site router;

At 506, the first radio unit determines whether the connection operability issue still exists based on the sending of the DHCP discover requests. In an example embodiment, determining whether the connection operability issue still exists based on the sending of the DHCP discover requests may include, after sending a threshold number of DHCP discover requests over the connection between the first radio unit and the cellular site router without receiving a response, rebooting the first radio unit with zero-touch provisioning (ZTP). The sending of the DHCP discover requests includes sending DHCP discover requests over the connection between the first radio unit and the cellular site router after the rebooting of the first radio unit. Determining whether the connection operability issue still exists may be based on sending the DHCP discover requests after the rebooting of the first radio unit. The first radio unit may determine the connection operability issue still exists in response to, after sending the DHCP discover requests after the rebooting of the first radio unit, there is still no response to the DHCP discover.

For example, determining whether the connection operability issue still exists based on the sending of the DHCP discover requests may include determining whether a timer has expired for receiving a response to sending of the DHCP discover requests. Determining that the connection operability issue still exists is based on a determination that the timer has expired for receiving a response to sending of the DHCP discover requests At 508, the first radio unit, in response to determining that the connection operability issue still exists, determines that the cabled connection between the first radio unit and the cellular site router has failed.

Figure 6:
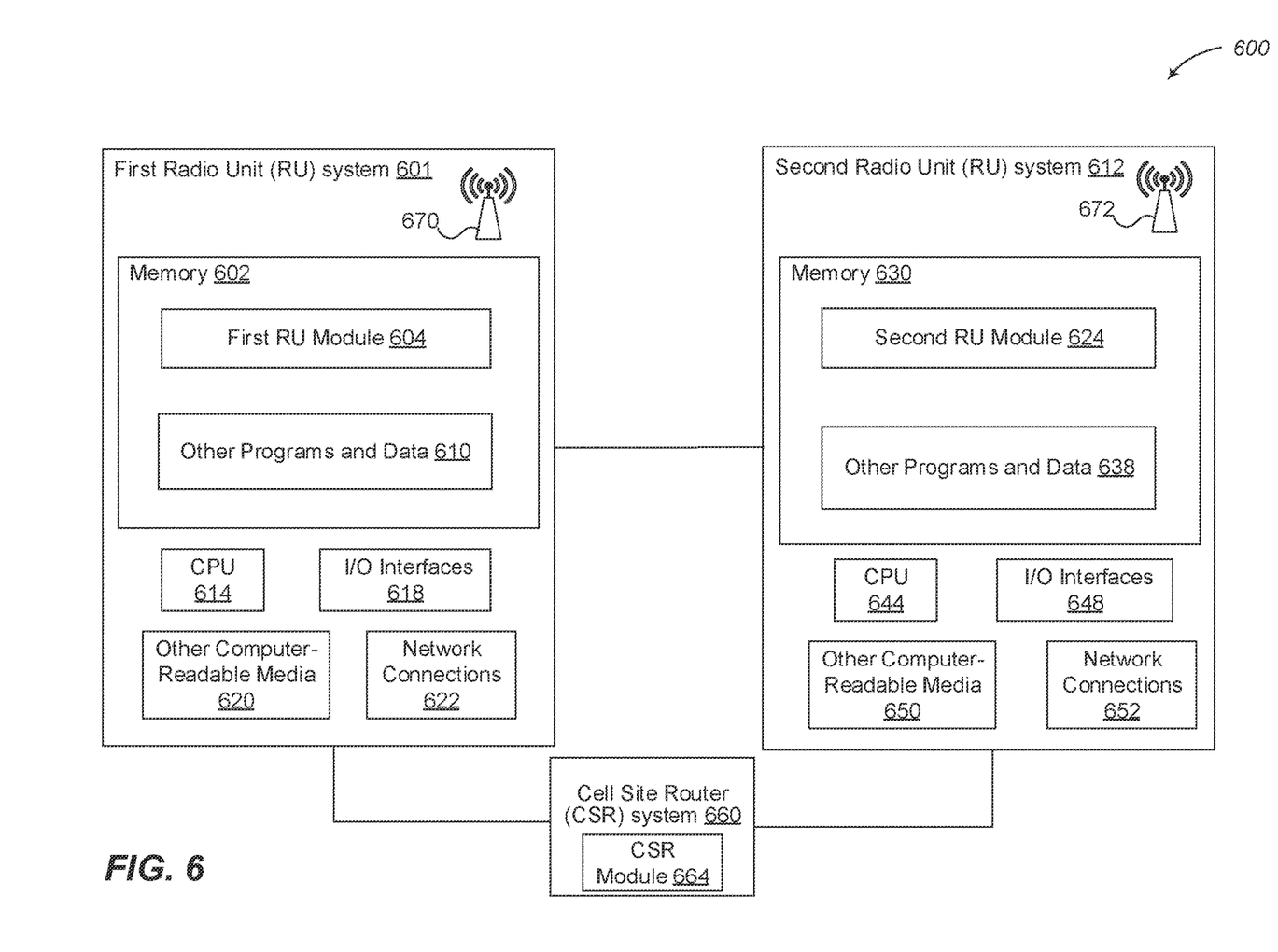
FIG. 6 shows a system diagram that describes various implementations of computing systems for implementing embodiments described herein.

FIG. 6 shows a system diagram that describes various implementations of computing systems 600 for implementing embodiments described herein.

The first RU 106, the second RU 108 and the CSR, such as CSR 130, can be implemented using respective underlying computing systems, an example of which is respectively shown in FIG. 6 as first RU system 601, second RU system 612 and CSR system 660.

In some embodiments, one or more special-purpose computing systems may be used to implement first RU system 601. Accordingly, various embodiments described herein may be implemented in software, hardware, firmware, or in some combination thereof. The first RU system 601 may include memory 602, one or more central processing units (CPUs) 614, I/O interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including embodiments described herein.

Memory 602 may have stored thereon First RU module 604. The first RU module 604 is configured to implement and/or perform some or all of the functions of the first RU 106 described herein and interface with radio transceiver 670. Memory 602 may also store other programs and data 610, which may include thresholds for DHCP requests, connection recovery algorithms, connection recovery rules, network protocols, O-RAN operating rules, user interfaces, operating systems, etc.

Network connections 622 are configured to communicate with other computing devices and to facilitate the radio unit backup connection operations described herein via at least two physical network ports of the first RU 102. In various embodiments, the network connections 622 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/transparent bridge in order to support RU copy and combine function for O-RAN cascade mode. I/O interfaces 618 may include video interfaces, radio link interfaces, other data input or output interfaces, or the like. Other computer-readable media 620 may include other types of stationary or removable computer-readable media, such as removable flash drives, external hard drives, or the like.

In some embodiments, one or more special-purpose computing systems may be used to implement second RU system 612. Accordingly, various embodiments described herein may be implemented in software, hardware, firmware, or in some combination thereof. Second RU system 612 is an example of a computer system that may implement second RU 108. Computer system(s) 612 may include memory 630, one or more central processing units (CPUs) 644, I/O interfaces 648, other computer-readable media 650, and network connections 652.

Memory 630 may include one or more various types of non-volatile and/or volatile storage technologies similar to memory 602. Memory 630 may be utilized to store information, including computer-readable instructions that are utilized by CPU 644 to perform actions, including embodiments described herein.

Memory 630 may have stored thereon second RU module 624. The second RU module 624 is configured to implement and/or perform some or all of the functions of the second RU 108 described herein and interface with radio transceiver 672. Memory 602 may also store other programs and data 638, which may include thresholds for DHCP requests, connection recovery algorithms, connection recovery rules, network protocols, O-RAN operating rules, user interfaces, operating systems, etc.

Network connections 652 are configured to communicate with other computing devices and to facilitate the radio unit backup connection operations described herein via at least two physical network ports of the second RU 108. In various embodiments, the network connections 652 include transmitters and receivers and L2 switch and physical network ports (not illustrated) to send and receive data as described herein, and to send and receive instructions, commands and data to implement the processes described herein. I/O interfaces 648 may include video interfaces, radio link interfaces, other data input or output interfaces, or the like. Other computer-readable media 650 may include other types of stationary or removable computer-readable media, such as removable flash drives, external hard drives, or the like.

The CSR system 660 includes CSR module 664, which is configured to implement and/or perform some or all of the functions of CSR 130 described herein. The CSR computing system 660 may have some of the same or similar corresponding components as that shown in FIG. 6 for first RU system 601 and/or second RY system 612 (e.g., memory storing CSR module 664, CPU, I/O interfaces, other computer-readable media and network connections, etc.).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system of a first radio unit of a cellular telecommunications tower, the system comprising:
   at least one memory that stores computer instructions; and
   at least one processor that executes the computer instructions to perform actions, the actions including:
   determining that a cabled connection directly between the first radio unit of the cellular telecommunications tower and a cellular site router of the cellular telecommunications tower has failed, wherein the cabled connection directly between the first radio unit and the cellular site router uses a first physical network port of the first radio unit; and
   in response to determining that the connection between the first radio unit and the cellular site router has failed, initiating activation of an existing backup cabled connection from the first radio unit to the cellular site router through a cabled connection between the first radio unit and a second radio unit of the cellular telecommunications tower, wherein the cabled connection between the first radio unit and a second radio unit uses a second physical network port of the first radio unit and the second radio unit also has an existing separate cabled connection directly to the cellular site router.

2. The system of claim 1, wherein the determining that the cabled connection directly between the first radio unit and the cellular site router has failed includes:
- detecting that a connection operability issue exists in the connection between the first radio unit and the cellular site router;
- in response to detecting that the operability issue exists, sending dynamic host control protocol (DHCP) discover requests over the connection between the first radio unit and the cellular site router;
- determining whether the connection operability issue still exists based on the sending of the DHCP discover requests; and
- in response to determining that the connection operability issue still exists, determining that the cabled connection between the first radio unit and the cellular site router has failed.

3. The system of claim 2, wherein the determining whether the connection operability issue still exists based on the sending of the DHCP discover requests includes:
- after sending a threshold number of DHCP discover requests over the connection between the first radio unit and the cellular site router without receiving a response, rebooting the first radio unit with zero-touch provisioning (ZTP), wherein:
  - the sending the DHCP discover requests includes sending DHCP discover requests over the connection between the first radio unit and the cellular site router after the rebooting of the first radio unit; and
  - the determining whether the connection operability issue still exists is based on the sending of the DHCP discover requests after the rebooting of the first radio unit.

4. The system of claim 2, wherein the determining whether the connection operability issue still exists based on the sending of the DHCP discover requests includes:
- determining whether a timer has expired for receiving a response to sending of the DHCP discover requests; and
- determining that the connection operability issue still exists based on a determination that the timer has expired for receiving a response to sending of the DHCP discover requests.

5. The system of claim 2, wherein the detecting that a connection operability issue exists in the connection between the first radio unit and the cellular site router includes:
- detecting that a connection operability issue exists in the connection between the first radio unit and the cellular site router based on one or more of:
- detected expiration of an Open Radio Access Network (O-RAN) management plane (M-plane) supervision watchdog timer that monitors connection between the first radio unit and the cellular site router;
- one or more Ethernet Loopback Messages (LBM) and Loopback Replies (LBR) over the connection between the first radio unit and the cellular site router; and
- whether an O-RAN fronthaul control plane/user plane (C/U Plane) Enhanced Common Public Radio Interface (eCPRI) network delay measurement message has been received regarding the connection between the first radio unit and the cellular site router.

6. The system of claim 1, wherein the initiating the activation of the existing backup cabled connection from the first radio unit to the cellular site router includes:
- causing the first radio unit to enter from a normal operating mode into an O-RAN cascade operating mode to attempt to attain network connectivity for the first radio unit via the existing backup cabled connection between the first radio unit and the second radio unit using the second physical network port of the first radio unit.

7. The system of claim 6, wherein the causing the first radio unit to enter from a normal operating mode into an O-RAN cascade operating mode to attempt to attain network connectivity for the first radio unit via the existing backup cabled connection includes:
- causing the first radio unit to perform an O-RAN cascade mode ZTP process that causes the first radio unit to send Ethernet packets to the second radio unit over the backup cabled connection between the first radio unit and the second radio via the second physical network port of the first radio unit instead of the first physical network port of the first radio unit.

8. The system of claim 1, wherein the initiating the activation of the existing backup cabled connection from the first radio unit to the cellular site router includes:
- causing the second radio unit to enter from a normal operating mode into an O-RAN cascade operating mode to attempt to attain network connectivity for the first radio unit via the existing backup cabled connection between the first radio unit and the second radio unit by causing the first radio unit to send Ethernet packets to the second radio unit over the backup cabled connection between the first radio unit and the second radio via the second physical network port of the first radio unit; and
- the second radio unit entering into an O-RAN cascade operating mode causing the second radio unit to use Ethernet forwarding to attempt to forward the Ethernet packets received from the first radio unit to the cellular site router over the existing separate cabled connection of the second radio unit directly to the cellular site router.

9. The system of claim 1, wherein the at least one processor executes the computer instructions to perform further actions including:
- after initiating activation of the existing backup cabled connection from the first radio unit to the cellular site router through a cabled connection between the first radio unit and a second radio unit, determining whether the backup cabled connection has also failed;
- in response to determining the backup cabled connection has also failed, determining whether a connection operability issue still exists in the connection between the first radio unit and the cellular site router;
- in response to determining, after recovery actions, a connection operability issue still exists in the connection between the first radio unit and the cellular site router, perform the initiating activation of the existing backup cabled connection again;
- performing the determining whether the backup cabled connection has also failed and the determining whether a connection operability issue still exists in the connection between the first radio unit and the cellular site router in a loop until an operable connection, either the connection between the first radio unit and the cellular site router or the backup cabled connection, is found; and the first radio unit switching to using the operable connection to the cellular site router.

10. The system of claim 1 wherein the determining that the cabled connection directly between the first radio unit and the cellular site router has failed includes:

determining that the cabled connection directly between the first radio unit and the cellular site router has failed based on one or more of:
a malfunction of the first physical network port of the first radio unit;
a malfunction of a cable providing the cabled connection directly between the first radio unit and the cellular site router; and
a malfunction of a physical network port of the cellular site router into which the cable is or was plugged; and
a malfunction of one or more transport modules associated with the first physical network port of the first radio unit or a physical network port of the cellular site router.

11. The system of claim 1 wherein the cabled connection directly between the first radio unit and the cellular site router and the separate cabled connection of the second radio unit directly to the cellular site router are fiber optic cable connections.

12. The system of claim 11 wherein:
the first physical network port of the first radio unit is a small form pluggable (SFP) port with its own media access control (MAC) address for use as a separate network address in communication with the second radio unit; and
the second physical network port of the first radio unit is also an SFP port with its own MAC address for use as a separate network address in communication with the cellular site router.

13. A method in a first radio unit of a cellular telecommunications tower, the method comprising:
determining that a cabled connection directly between the first radio unit of the cellular telecommunications tower and a cellular site router of the cellular telecommunications tower has failed, wherein the cabled connection directly between the first radio unit and the cellular site router uses a first physical network port of the first radio unit; and
in response to determining that the connection between the first radio unit and the cellular site router has failed, initiating activation of an existing backup cabled connection from the first radio unit to the cellular site router through a cabled connection between the first radio unit and a second radio unit of the cellular telecommunications tower, wherein the cabled connection between the first radio unit and a second radio unit uses a second physical network port of the first radio unit and the second radio unit also has an existing separate cabled connection directly to the cellular site router.

14. The method of claim 13, wherein the determining that the cabled connection directly between the first radio unit and the cellular site router has failed includes:
detecting that a connection operability issue exists in the connection between the first radio unit and the cellular site router;
in response to detecting that the operability issue exists, sending dynamic host control protocol (DHCP) discover requests over the connection between the first radio unit and the cellular site router;
determining whether the connection operability issue still exists based on the sending of the DHCP discover requests; and
in response to determining that the connection operability issue still exists, determining that the cabled connection between the first radio unit and the cellular site router has failed.

15. The method of claim 14, wherein the determining whether the connection operability issue still exists based on the sending of the DHCP discover requests includes:
after sending a threshold number of DHCP discover requests over the connection between the first radio unit and the cellular site router without receiving a response, rebooting the first radio unit with zero-touch provisioning (ZTP), wherein:
the sending the DHCP discover requests includes sending DHCP discover requests over the connection between the first radio unit and the cellular site router after the rebooting of the first radio unit; and
the determining whether the connection operability issue still exists is based on the sending of the DHCP discover requests after the rebooting of the first radio unit.

16. The method of claim 14, wherein the determining whether the connection operability issue still exists based on the sending of the DHCP discover requests includes:
determining whether a timer has expired for receiving a response to sending of the DHCP discover requests; and
determining that the connection operability issue still exists based on a determination that the timer has expired for receiving a response to sending of the DHCP discover requests.

17. A non-transitory computer-readable storage medium having computer-executable instructions stored thereon that, when executed by at least one processor, cause the at least one processor to perform operations including:
determining that a cabled connection directly between a first radio unit of a cellular telecommunications tower and a cellular site router of the cellular telecommunications tower has failed, wherein the cabled connection directly between the first radio unit and the cellular site router uses a first physical network port of the first radio unit; and
in response to determining that the connection between the first radio unit and the cellular site router has failed, initiating activation of an existing backup cabled connection from the first radio unit to the cellular site router through a cabled connection between the first radio unit and a second radio unit of the cellular telecommunications tower, wherein the cabled connection between the first radio unit and a second radio unit uses a second physical network port of the first radio unit and the second radio unit also has an existing separate cabled connection directly to the cellular site router.

18. The non-transitory computer-readable storage medium of claim 17, wherein the determining that the cabled connection directly between the first radio unit and the cellular site router has failed includes:
detecting that a connection operability issue exists in the connection between the first radio unit and the cellular site router;
in response to detecting that the operability issue exists, sending dynamic host control protocol (DHCP) discover requests over the connection between the first radio unit and the cellular site router;

determining whether the connection operability issue still exists based on the sending of the DHCP discover requests; and in response to determining that the connection operability issue still exists, determining that the cabled connection between the first radio unit and the cellular site router has failed.

19. The non-transitory computer-readable storage medium of claim 18, wherein the determining whether the connection operability issue still exists based on the sending of the DHCP discover requests includes:

after sending a threshold number of DHCP discover requests over the connection between the first radio unit and the cellular site router without receiving a response, rebooting the first radio unit with zero-touch provisioning (ZTP), wherein:

the sending the DHCP discover requests includes sending DHCP discover requests over the connection between the first radio unit and the cellular site router after the rebooting of the first radio unit; and the determining whether the connection operability issue still exists is based on the sending of the DHCP discover requests after the rebooting of the first radio unit.

20. The non-transitory computer-readable storage medium of claim 18, wherein the determining whether the connection operability issue still exists based on the sending of the DHCP discover requests includes:

determining whether a timer has expired for receiving a response to sending of the DHCP discover requests; and determining that the connection operability issue still exists based on a determination that the timer has expired for receiving a response to sending of the DHCP discover requests.

\* \* \* \* \*